April 2, 1957 R. L. BROCK ET AL 2,787,744

TEMPERATURE STABILIZED TRANSISTOR

Filed April 20, 1953

INVENTORS.
ROBERT L. BROCK
THOMAS NEIL ROSS
ROBERT C. McCARTY
JOHN E. MAYNARD

BY Roy Mattern Jr.

ATTORNEY

United States Patent Office 2,787,744
Patented Apr. 2, 1957

2,787,744

TEMPERATURE STABILIZED TRANSISTOR

Robert L. Brock, John E. Maynard, Robert C. McCarthy, and Thomas N. Ross, Seattle, Wash., assignors to Boeing Airplane Company, a corporation of Delaware Application April 20, 1953, Serial No. 349,662
9 Claims. (Cl. 317—235)

This invention relates to transistors and more particularly to a cooling means for stabilizing the operating temperatures.

The purpose of the invention is to obtain uniform dependable operating characteristics from transistors by avoiding self-heating and ambient temperature effects that change circuit resistances and cause hysteretic losses.

This invention, by establishing temperature stability, eliminates one serious obstacle that in the past has limited the application of transistors in electronic circuits. Previously, after the current has initiated in a typical transistor circuit, unpredictable and varying operation occurred during the initial few minutes of operation.

This invention, therefore, is directed to obtaining uniform operational characteristics from transistors throughout their entire period of use. The invention does not involve any changes to the critical arrangement of the basic components of transistor, but instead is concerned with cooling the components while the transistor is in operation.

The need for cooling is fully appreciated when it is realized that the collector circuit wire of the transistor carries a current having a density which may be as high as 4000 amperes per square inch and at its point of contact with the germanium slab its diameter is only in the order of three thousandths of an inch. In addition, the emitter circuit wire makes contact with the slab immediately adjacent to the contact area of the collector circuit wire, the spacing between the contact areas being limited to a few thousandths of an inch. As a result of this arrangement, localized self heating effects around the contact locations combine with ambient temperature changes to affect the overall performance characteristics of the transistors causing especially critical fluctuations as the current initially passes through the transistor.

To avoid this overheating, forced circulation of a fluid through the space surrounding the transistor contacts would be the most assured way of obtaining sufficient cooling. However, in many instances there is a need for a compact self-contained transistor unit. This requirement calls for a self-sustaining cooling method that is adaptable to the transistor unit itself. The cooling method in turn requires a coolant that necessarily must not destroy the standard operation of the transistor but on the other hand it must have a high thermal capacity to absorb heat. In addition, the coolant must remove the heat that it has absorbed, by virtue of its own faculty to establish self-sustaining natural convection currents in the presence of minor differential temperature changes. A coolant having these specifications is aliphatic petroleum, a form of kerosene. The molecules of such a liquid do not exhibit appreciable polar electric moments, thereby assuring normal operation of the transistor. If the coolant were to exhibit appreciable polar electric moments the normal operation of the transistor would be destroyed within a twenty-four hour period, for the polar molecules would attach themselves to the transistor surface interfering with its operation.

The molecular organic compound selected as the ingredient of the coolant therefore must be an aliphatic rather than an aromatic compound, the former has principally single bonds between the carbon atoms, and the double bonds that may be present do not shift readily. By using a saturated aliphatic compound there is no possibility that the coolant will have the facility of shifting its bonding structure to affect the germanium surface.

However, where there is a possibility that the coolant contains unstable molecules, an additional means (not shown) is used to attract and hold polar molecules free of the germanium surfaces. The means comprises equipment to maintain an electric field in a restricted area through which the coolant fluid circulates.

Where the transistor is to be self-contained and the coolant is to be kerosene or a liquid of similar characteristics, it is necessary to provide a fluid tight structure about the transistor components which in addition to providing support for the transistor, also provides a sufficient volume so the coolant may circulate conveying heat to the interior of the fluid tight structure. Thereafter the heat is conducted through the walls of the structure for radiation into the surrounding air. Also, in designing a fluid tight structure of this type, the unlike expansion characteristics of the coolant and the container must be recognized.

The manner in which these fundamental considerations are incorporated into a useful embodiment is not subject to extensive restrictions. One embodiment illustrated in the accompanying drawing successfully incorporates standard items such as sockets, transistors, housings, and seals. The other embodiment illustrates a commercial production design of a transistor unit.

The invention will become more apparent as the following description of the embodiments is read and reference is made to the accompanying drawings in which the same part is designated by a like numeral throughout the several figures, where:

Figures 1, 2, 3, 4:
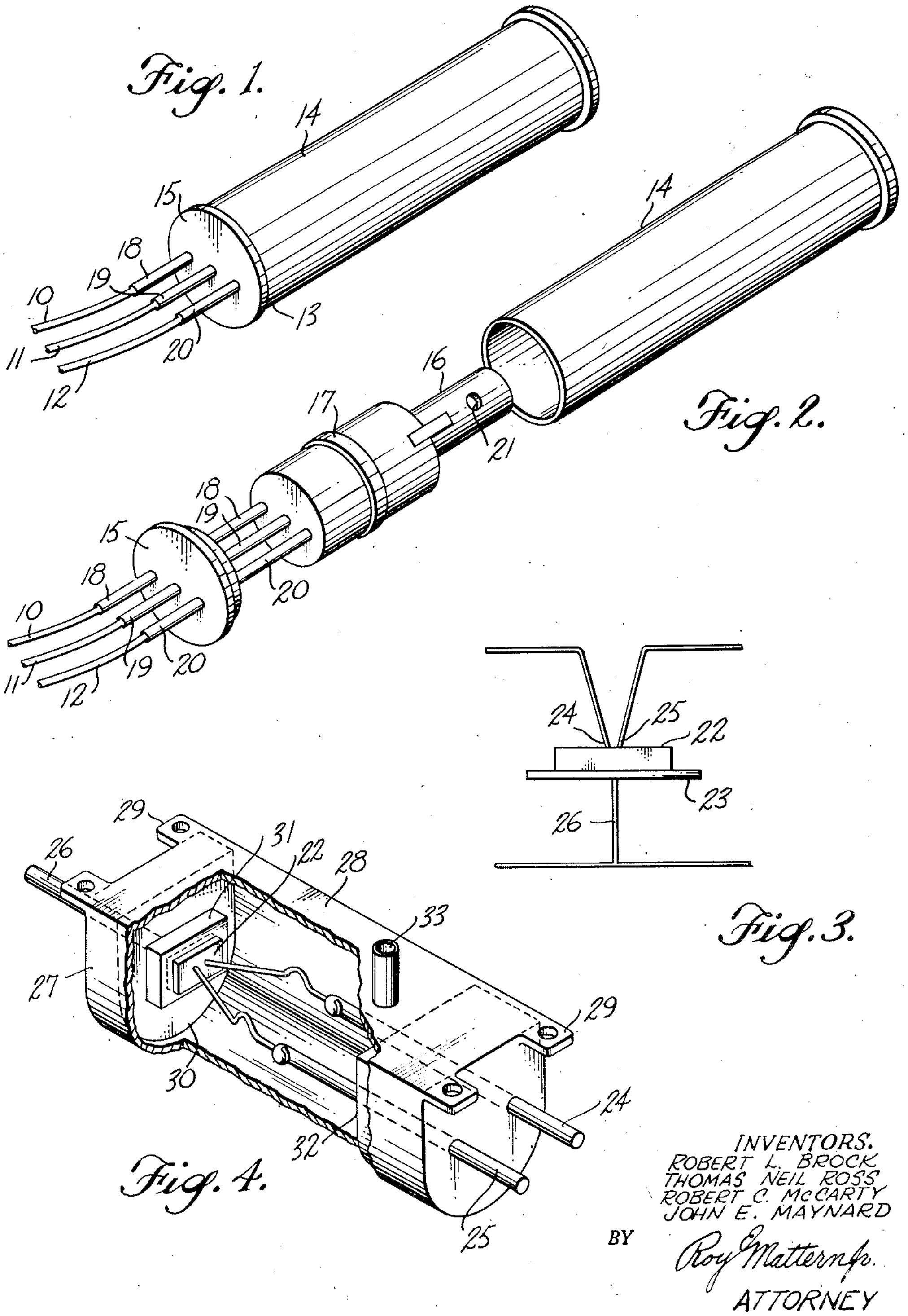
Figure 1 is a perspective view of the exterior of the fluid tight encasement of the transistor.
Figure 2 is a perspective view of the opened encasement with the transistor unit removed.
Figure 3 is a basic diagram of a transistor circuit.
Figure 4 is a perspective view, partially broken away, of another embodiment, designed for commercial production.

The first embodiment shown in Figures 1 and 2 is an adaptation of a cylindrical encasement to a transistor, its associated socket and its circuit wiring.

In Figure 1, the encased transistor is shown completely assembled and ready for use. Three circuit wires 10, 11, and 12 extend from a capped end 13 of an encasement or jacket 14.

In Figure 2, the cap 15 has been removed from the encasement 14 and the interior assembly that includes the transistor unit 16, its socket 17, and the terminals 18, 19, and 20 has been withdrawn. These components are interconnected. The transistor unit 16 is fitted to the socket 17 and the terminals 18, 19, 20 of the socket, as extended, pass through the cap 15 and are secured thereto.

When all these parts are assembled, the interior of the encasement 14 is spaced from the transistor unit 16 and this space surrounding the transistor is filled with the coolant. To increase the effectiveness of the coolant, the typical transistor unit 16 is modified by removing the wax that normally occupies the interior thereby permitting flow through the existing holes 21 into its own interior. In this interior are the components diagrammatically represented in Figure 3 in the conventional manner: the germanium slab 22, the underlying metal contact 23, the emitter circuit contact wire 24, the collector circuit contact wire 25 and the base contact wire 26.

The coolant circulates around these transistor components adequately conducting the heat away from the critical locations. The heat is carried to the encasement 14 by the self-sustaining convection currents that continue in the presence of a temperature differential and thereafter is radiated from the exterior of the encasement. In this way the transistor is adequately and dependably cooled.

The other embodiment shown in Figure 4 is designed with all the same purposes in mind and results in the same basic structure. However, this cooled transistor does not incorporate the standard parts utilized in the first embodiment. The arrangement instead, is a composite design especially built around the transistor elements shown in Figure 3 for convenience of manufacturing and utilization.

An encasement 27 forms a shell and supporting structure which defines a volume essentially rectangular in shape with one flat external side 28 for heat conduction purposes and with extending portions 29 utilized to secure the encasement 27 to a circuit mounting panel (not shown).

At each end in the interior of the encasement 27 there is an insulating block. At one end, the insulating block 30 supports the germanium slab 22 which is embedded in a conducting mount 31. Also the base lead 26 projects through the block 30 into the space surrounding the encasement 27. At the other end, the insulating block 32 supports the emitter lead 24 and the collector lead 25, which are positioned within the encasement 27 at the required minimum spacing between their terminating ends and the germanium slab 22.

The transistor circuit components as located within the defined volume are readily cooled during operation as the coolant freely circulates around them. As shown in Figure 4 there is a filling tube 33 attached to side 28. The coolant poured through this tube 33, fills the entire volume so that the liquid contacts the inner surface of the top side 28 thereby assuring adequate head conduction. Upon completion of the filling, the partially filled tube 33 is sealed forming an air pocket in the tube that serves as a pressure relief means for the entire encasement 27 which is sealed throughout by conventional means. Where additional expansive characteristics must be reckoned with, metal corrugations could be provided in the tube 33 and/or casing 27 to relieve the pressure.

It is to be understood that other types of coolants can be utilized which exhibit all or substantially all of the required characteristics such as:

1. Be compatible with the transistor itself. Among other things being substantially free of polar electric moments.
2. Have a high thermal capacity.
3. Establish self-sustaining natural convection currents in the presence of minor differential temperature changes.

Other types of such coolants are:

1. Additional saturated aliphatic hydrocarbons, such as decane, diisoamyl, and nonane.
2. Aromatic hydrocarbons, for example ethylbenzene, p-xylene, or toluene.
3. Saturated cyclic compounds such as cyclohexane.
4. Thiophene and its derivatives such as 2,4-dimethylthiophene and 2-propylthiophene.
5. Perfluorinated organic compounds, including perfluorinated ethers such as $C_8F_{16}O$, Minnesota Mining and Manufacturing Company Fluorochemical #O-75; perfluoroamines such as $(C_4H_9)_3N$, Minnesota Mining and Manufacturing Company Fluorochemical #N-43, and perfluoro-m-dimethylcyclohexane.
6. Low viscosity polysiloxanes such as Dow Corning Corp. 200 series 0.65 centistoke fluid.

Although the embodiments shown involve the encasement of one transistor unit, they could be enlarged to accommodate several centrally located transistors. If this were done a refrigeration and/or forced fluid system might be utilized and the encasement could be equipped with projecting fins to provide larger cooling and radiating surfaces. The invention is likewise adaptable to all types of transistors: the co-axial, the wedge and the junction as well as the illustrated point contact transistor.

We claim:

1. A liquid cooled transistor comprising an encompassing jacket, a transistor supported within the jacket, and a liquid composed of molecules substantially free of polar electric moments, contained within the jacket and freely circulated around the transistor.

2. A means for cooling the components of a transistor comprising a transistor, a surrounding fluid tight structure that supports the transistor, and a liquid coolant contained within the structure for circulation around the transistor components, the liquid being composed of molecules substantially free of polar electric moments.

3. A transistor unit for operation at a stabilized temperature comprising a transistor, a surrounding fluid-tight structure supporting the transistor, and a liquid coolant within the fluid-tight structure, the liquid being substantially free of polar electric moments.

4. A transistor unit for operation at a stabilized temperature comprising a fluid-tight structure, a transistor supported within the structure, and a liquid coolant free of polar molecules within the fluid-tight structure for circulation around the transistor.

5. A liquid coolant transistor comprising a jacket, a transistor supported within the jacket and a liquid coolant having non-polar molecules within the jacket for circulation around the transistor.

6. A transistor for operation at stabilized temperatures comprising the transistor, a means for supporting the transistor components and providing a fluid-tight encasement about the transistor, and a liquid coolant consisting of a non-polar saturated aliphatic organic compound within the fluid-tight encasement.

7. A transistor having uniform operating characteristics at a stabilized temperature comprising an encasement, a transistor supported within the encasement, a coolant in the encasement for convection circulation about the transistor components, being substantially free of polar molecules thereby assuring the continued operation of the transistor.

8. A transistor having substantially uniform characteristics throughout its entire operating range, obtained by the direct cooling of all the transistor components, comprising an encasement, a transistor supported within the encasement, and a coolant free from appreciable polar electric moments within the encasement surrounding the transistor components.

9. A transistor having very reliable and uniform performance characteristics throughout its entire operating range, the uniformity being assured by the continuous direct cooling of all the transistor components, comprising a transistor, a means for supporting the transistor components, a fluid tight structure surrounding the transistor, and a liquid coolant, compatible with the transistor components being substantially free of polar electric moments, surrounding the transistor and contained within the fluid tight structure for circulation around the transistor.

References Cited in the file of this patent

UNITED STATES PATENTS

| | | |
|---|---|---|
| 2,288,341 | Addink | June 30, 1942 |
| 2,402,661 | Ohl | June 25, 1946 |
| 2,432,594 | Thompson | Dec. 16, 1947 |